United States Patent [19]

Lo

[11] Patent Number: 4,913,242

[45] Date of Patent: Apr. 3, 1990

[54] ELECTRIC SCREW DRIVER

[75] Inventor: Juey-Yuan Lo, Yungho, Taiwan

[73] Assignee: Top Driver Enterprise Co., Ltd., Yungho, Taiwan

[21] Appl. No.: 390,008

[22] Filed: Aug. 7, 1989

[51] Int. Cl.[4] .......... B25B 23/157

[52] U.S. Cl. .......... 173/12; 81/473; 192/56 R

[58] Field of Search .......... 173/12, 146, 163; 81/473, 474, 467; 192/150, 56 R

[56] References Cited

U.S. PATENT DOCUMENTS

| | | | |
|---|---|---|---|
| 3,616,883 | 11/1971 | Sindelar | 81/474 |
| 3,792,737 | 2/1974 | Bratt | 173/12 |
| 4,458,565 | 7/1984 | Zilly et al. | 173/12 |
| 4,513,827 | 4/1985 | Dubrel | 173/12 |
| 4,635,731 | 1/1987 | Wallace et al. | 173/12 |
| 4,712,456 | 12/1987 | Yuan | 173/12 |
| 4,756,216 | 7/1988 | Lo | 81/473 |

*Primary Examiner*—Frank T. Yost
*Assistant Examiner*—Scott A. Smith
*Attorney, Agent, or Firm*—Sughrue, Mion, Zinn, Macpeak and Seas

[57] ABSTRACT

Shock caused to a clutch mechanism of an electric screw driver is minimized by bearing members, adjacent to upper and lower clutch members, which are provided with bearing distal ends which contact one another when one of the clutch members moves toward the other clutch member by means of the biasing force of an adjustment coil spring. The bearing distal ends prevents the clutch members from impacting with one another. Resilient convex discs which bulge in opposite directions are provided adjacent to one of the bearing member to absorb shock caused to the bearing members. Limitedly movable engaging members are provided in the clutch members to minimize localized wear of the engaging members.

3 Claims, 7 Drawing Sheets

ELECTRIC SCREW DRIVER

BACKGROUND OF THE INVENTION

This invention relates to an electric screw driver, and particularly to improvements relating to a clutch assembly of an electric screw driver.

Clutch mechanisms of electric screw drivers generally include an upper clutch member having a bottom disc portion with engaging projections to engage with engaging projections provided on a disc portion of a lower clutch member. An example of an electric screw driver is shown in FIG. 1, wherein numerals 11, 12, 13, 14, and 15 respectively represent a disc portion of an upper clutch member, an engaging projection 12 of the clutch member, a lower clutch member, a disc portion of the lower clutch member and projections of the lower clutch member. The lower clutch member is retained by a bearing housing 18 which is biased upward by a coil spring 17 so that the lower clutch member engages with the upper clutch member. A motor 10 is provided to impart a rotational motion to the screw driver head 16 through the clutch mechanism. In common practice, when a screw turned by the screw driver becomes tightly set in the object into which it is being driven, the head 16 cannot be turned further due to the immobilized screw. Accordingly, the lower clutch member is restricted from rotation. However, the upper clutch member rotates continuously so that the projection 12 intermittently passes the protrusions 15 by pushing them slightly downward against the torsion adjusting coil spring 17. Usually, impacts are directly imparted to the disc portions of the clutch member when the protrusions 15 are moved upward again by the coil spring 17 each time after they are pushed downward, thereby rapidly degrading the performance of the clutch members.

SUMMARY OF THE INVENTION

An object of the invention is to reduce the shock caused to the clutch members of an electric screw driver.

Another object of the invention is to minimize the wear caused to engaging elements of the clutch members.

According to the present invention, bearing members respectively provided adjacent to the clutch members of a screw driver have distal bearing ends which abut with one another by the force of an adjustment coil spring. These distal bearing ends prevent the clutch members from impacting one another. Resilient convex discs which bulge in opposite directions are provided adjacent to one of the bearing members to absorb the shock caused to the bearing members. In addition, the clutch members are provided with limitedly rollable engaging elements which do not wear locally.

The present exemplary preferred embodiments will be described in detail with reference to the accompanying drawings, in which:

BRIEF DESCRIPTION THE DRAWINGS

DETAILED DESCRIPTION OF THE PREFERRED EMBODIMENTS

The present invention will be described in detail with reference to the accompanying drawings in which like elements are represented by like numerals.

Figure 1:
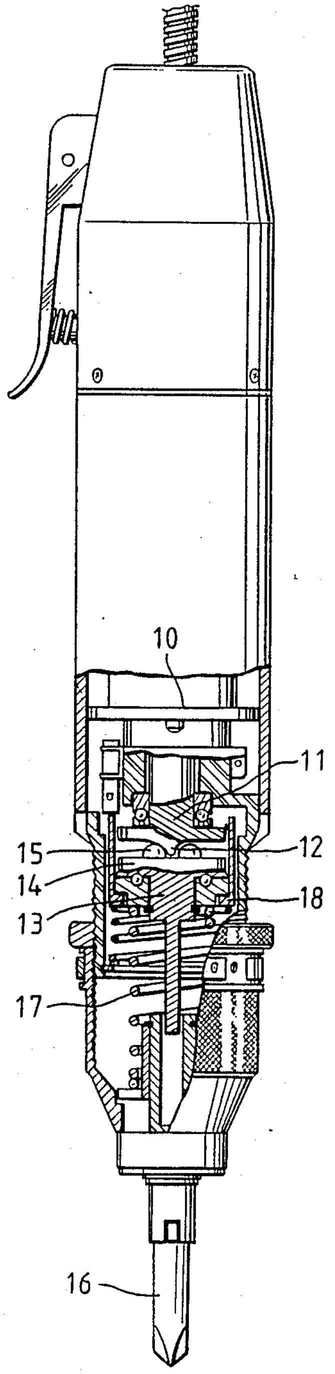
FIG. 1 (PRIOR ART)
FIG. 1 is a sectional view of a known screw driver.
Figure 2:
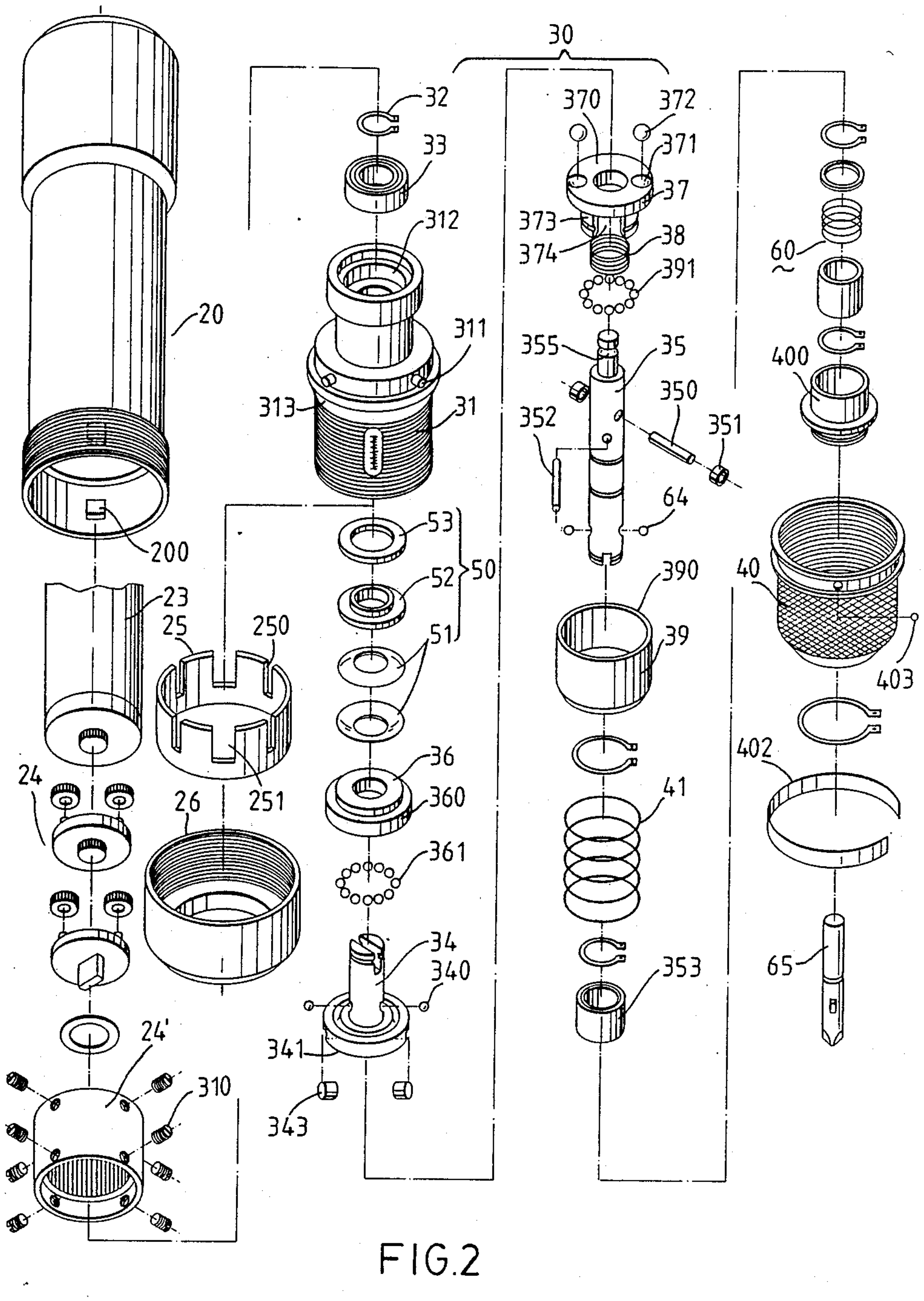
FIG. 2 is an exploded view of a portion of a screw driver the present invention.
Figure 3:
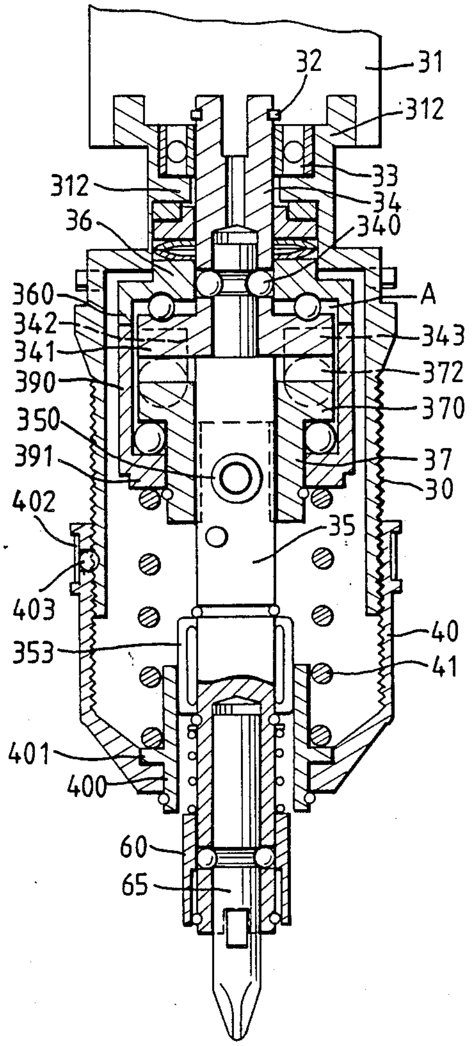
FIG. 3 is a sectional view showing the clutch members of FIG. 2 which are interengaged.

Referring to FIGS. 2 and 3, a portion of a semiautomatic screw driver is shown, including an intermediate housing body 20 and a lower housing body which is constituted by housing members 31 and 40 which are threadedly connected to one another. A ball 403 is positioned in the housing 40 by means of a press ring 402 to interengage the housing members 31 and 40. A gear box 24' is installed in the housing body 20 by means of screws 310. A threaded hollow member 26 is sleeved around the upper portion of the housing member 31 with the bottom side of the hollow member 26 engaging with the face 313 of the housing member 31, and screwed to the housing body 20. A guide member 25 is provided in the housing body 20 around the upper portion of the housing member 31. Protrusions 200 of the housing body 20 and protrusions 311 of the housing 31 respectively extend into the grooves 251 and 250. A motor 23 is mounted in the housing body 20 above the gear box 24' which encases a speed reduction gear assembly 24. Since these parts are conventional, the details thereof are not described herein.

The screw driver further includes a clutch assembly 30 which includes an elongated hollow upper clutch member 34 having a shank portion which is provided with a locking ring 32 and is journalled in a bearing assembly 33 which is positioned on an annular bearing seat 312 extending inward from the upper portion of the wall of the the housing member 31. A disc portion 341 of the hollow clutch member 34 is formed at the bottom end of the shank. Cylindrical engaging rollers 343 are provided in recesses 342 of the disc portion. Between the disc portion 341 and the bearing seat 312 is provided a shock absorbing means which includes two abutting convexed resilient discs 51, one of which bulges upward and the other of which bulges downward, as well as a guide member 52 and a packing ring 53. A bearing cap 36 is provided below the discs 51 and above the disc portion 341 of the clutch member 34, and bearing balls 361 are provided between the disc portion 341 and the bearing cap 36. The bearing cap 36 has a downwardly extending tubular flange 360. An upper portion of a driven shaft 35 is inserted into the hollow clutch member 34 and engages therewith by means of an annular groove 355 and engaging balls 340.

A lower clutch member 37 and a guide sleeve 38 are provided around the shaft 35. The lower clutch member 37 has a disc portion 370 adjacent to the upper clutch member 34 and a shank 373 extending downward. A bearing housing 39 has a tubular portion 390 whose upper end abuts with the end of the downward tubular flange 360 of the bearing cap 36, and an annular bottom flange 391 which extends inwardly from the tubular portion 390 to support the disc portion 370. On the top of the disc portion 370 are provided two recesses 371 receiving engaging balls 372. The balls 372 and the rollers 364 interengage with rolling contact surfaces during the operation of the screw driver. Bearing balls 391 are provided between the bottom flange 391 of the bearing housing 39 and the lower surface of the disc portion 370. A driving rod 350 is transversely inserted in the shaft 35 and provided with opposite engaging ends 351 extending into the openings 374 of the shank 373 of the lower clutch member 37. A stop pin 352 is inserted into the shaft 35 below the driving rod 350.

A sleeve member 400 is mounted on the bottom open end of the housing member 40. The lower end of the shaft 35 extends outward through the sleeve member 400 and connected to a screw driver head 65. A needle bearing assembly 353 is provided between the sleeve member 400 and the shaft 355. The screw driver head 65 is inserted into the shaft 35 and detachably secured thereto by means of an assembly 60 in a known manner.

A compression spring 41 is provided between the bearing housing 39 and the sleeve member 400 with the upper end thereof engaging with the the bottom flange 391 and the lower end thereof engaging with the flange 401 of the sleeve 400. The spring 41 urges the bearing housing 39 to move upward so that the lower clutch member 37 is moved upward and engages with the upper clutch member 34 via the interengagement of cylindrical rollers 343 and balls 372. The force of the spring 41 can be adjusted by turning the housing member 40 relative to the housing member.

Figure 4:
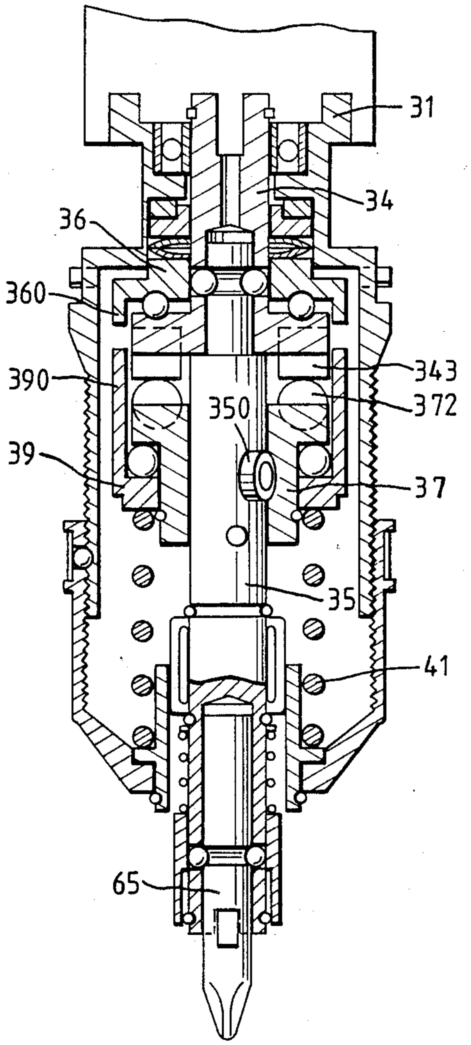
FIG. 4 is a sectional view showing that the lower clutch is disengaged from the upper clutch member.

The operation of the screw driver described above is similar to that of the conventional screw drivers. FIG. 3 shows the engaging position of the upper and lower clutch members 34, 37. FIG. 4 shows that the lower clutch member 37 is moved downward at the instant of being pushed by the rollers of the upper clutch member 34. The advantage of this invention is that impacts are not directly received by the disc portions and the engaging elements of the clutch members 34, 37 because the lower end of the downwardly extending tubular flange 360 of the bearing cap 36 stops any further upward movement of the bearing housing 39 when the bearing housing is moved upward from the position shown in FIG. 4, and receives all impacts caused by the returning force of the spring 41. To achieve this effect, the axial lengths of the downward annular flange 360 and the tubular portion 390 are dimensioned in such a manner that the bearing cap 36 and the bearing housing 39 confine an accommodating space A which has an axial length slightly greater, by a fraction of a millimeter, than the total axial length of the elements contained in the space A, i.e. the disc portions 341, 370 and the related parts. Such an arrangement prevents the lower clutch member 37 from impacting with the upper clutch member 34 and directs all impacts to the bearing cap 36 and the bearing housing 39. In addition, the impacts received by the bearing cap 36 and the bearing housing 39 can be reduced by the shock absorbing means 50 provided between the bearing seat 312 and the bearing cap 36, thereby minimizing the shock caused to the entire screw driver.

In addition to the above described advantages, the invention provides an arrangement for prolonging the lives of the engaging means of the upper and lower clutch members. The engaging means of the upper and lower clutch members are formed into rollers and spherical balls which can move to a limited degree in the recesses of the disc portions 341 and 370 due to the space A confined by the bearing cap 36 and the bearing housing 39. Such an arrangement minimizes localized wear of the engaging means of the clutch members.

Figure 5:
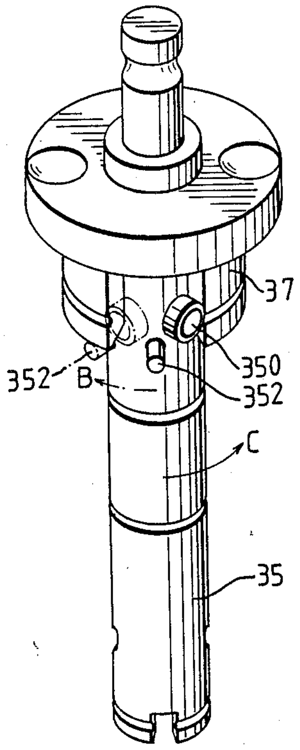
FIG. 5 is a sectional view illustrating the operation of transmission shaft which incorporates the present invention.

The advantages of the stop pin 352 will be described with reference to FIG. 5. When the driven shaft 35 is turned in a direction B which loosens a screw after being turned in a direction C which tightens a screw, the lower clutch member 37 is usually pushed downward and disengaged from the upper clutch member 34 because the torque required for loosening a screw is greater than that for tightening a screw. In common practice, the force of the torsion spring 41 is increased by adjustment to avoid disengaging the clutch members. The provision of the stop pin 352 eliminates the need to adjust the force of the spring in the above described case because the stop pin 352 moves to a location just below the bottom distal end of the clutch member 37 when the shaft 35 is turned in the direction B and prevents the clutch member 37 from moving downward.

Figure 6:
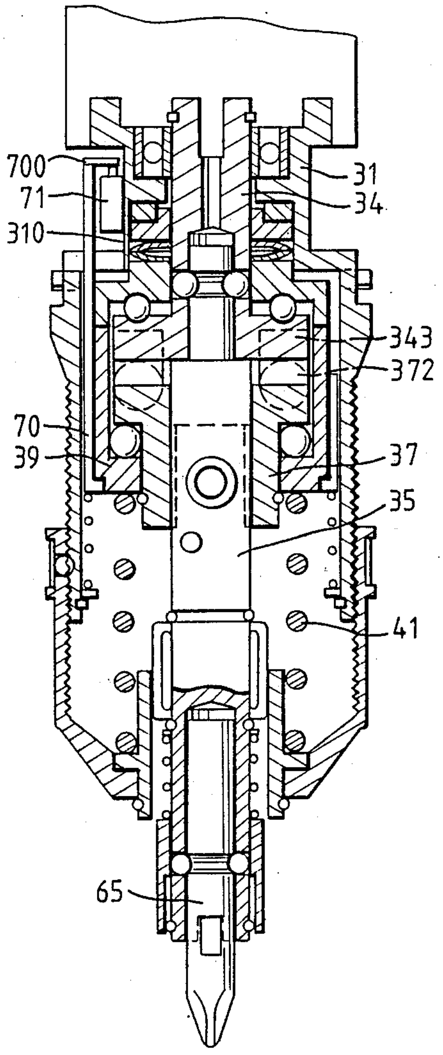
FIG. 6 is a sectional view of another screw driver which incorporates the present invention.

FIG. 6 shows a fully automatic screw driver which incorporates the present invention. An actuating rod 70 engages with the lower bearing housing 39 and extends upward to a switch 71 which is provided adjacent a neck portion 310 of the housing member 31. The press end 700 of the rod 70 depresses the switch 71 to stop the operation of the motor 23 when the bearing housing 39 moves downward.

Figure 7:
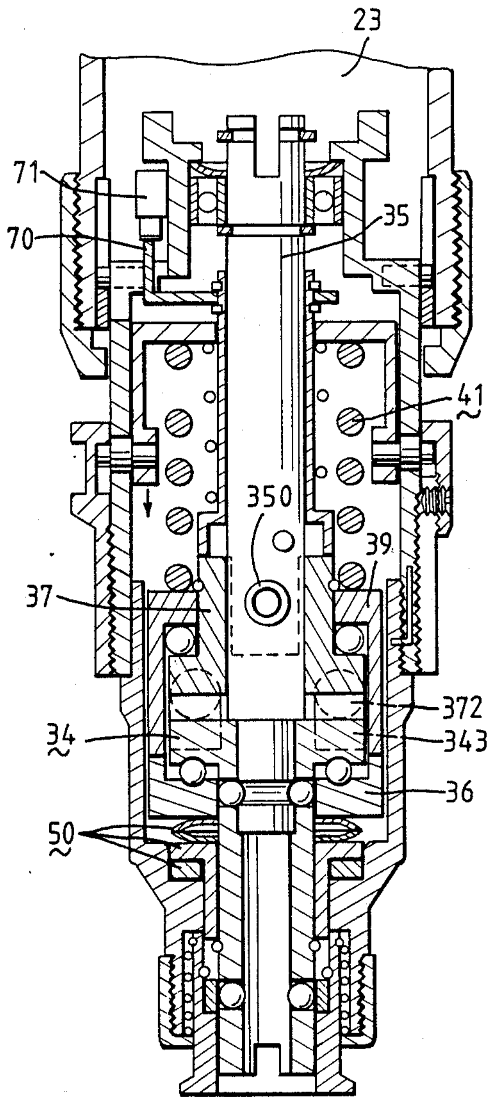
FIG. 7 is a sectional view of still another screw driver which incorporates the present invention.

FIG. 7 shows another screw driver incorporating the present invention, wherein the positions of the clutch members 34, 37, the bearing cap 36 and the bearing housing 39 are reversed, and the adjustment coil spring is provided around the shaft 35 above the clutch member 37.

With the invention thus explained, it is apparent that various modifications and variations can be made without departing from the scope of the invention. It it therefore intended that the invention be limited only as indicated in the appended claims.

What is claimed is:

1. An electric screw driver including an elongated housing body holding a screw-driver head and a motor which drives the screw-driver head through a transmission mechanism having a longitudinal transmission shaft and a clutching mechanism which is cooperatively associated with said longitudinal transmission shaft, said elongated housing body having a surrounding wall portion for receiving said clutching mechanism, said surrounding wall portion having a shoulder formation which defines a central hole, said clutching mechanism including a first clutch member which has a first disc portion at one side of said shoulder formation and a first hollow shank extending to the other side of said shoulder formation from said first disc portion through said central hole, said first disc portion having a first engaging means which projects from said first disc portion, a second clutch member which has a second disc portion facing said first disc portion and a second hollow shank which extends in a direction opposite to said first hollow shank, said second disc portion having second engaging means, said second hollow shank sleeved around said longitudinal shaft, a bearing housing a tubular portion around said second clutch member, said tubular portion having a distal bearing end extending toward said first disc portion, and an adjustment coil spring provided around said longitudinal transmission shaft and urges said bearing housing and said second clutch member to move toward said first clutch member, wherein the improvements comprise:

a bearing cap provided adjacent said first clutch member, said bearing cap having an annular flange extending axially around said first disc portion, said annular flange having a distal bearing end, said bearing housing and said bearing cap confining a space for receiving said first and second disc portions, said distal bearing end of said bearing housing contacting said distal bearing end of said bearing cap when said bearing housing is moved toward said bearing cap by the force of said adjustment coil spring, said distal bearing end of said bearing cap stopping any further upward movement of said bearing housing and receiving all impacts caused by the force of said adjustment spring; and a shock absorbing means provided between said shoulder formation of said elongated housing body and said bearing cap, and including two resilient convex disc members, around said first hollow shank, which bulge in opposite directions, and a packing member provided around said first hollow shank between said shoulder formation and said resilient convex disc members.

2. An electric screw driver as claimed in claim 1, wherein said first disc portion is provided with two diametrically opposite first recesses, said first engaging means including two cylindrical rollers, each of said first recesses receiving each of said cylindrical rollers, said second disc portion being provided with two diametrically opposite second recesses, said second engaging means including two spherical balls, each of said second recesses receiving each of said spherical balls, said cylindrical rollers and said spherical balls being permitted to move limitedly.

3. An electric screw driver as claimed in claim 1, in which said second hollow shank has a distal end, wherein the improvements further comprise a stop pin which projects radially outward from said longitudinal shaft to engage with said distal end of said second hollow shank and prevent the same from moving against the force of said adjustment coil spring when said longitudinal shaft is turned in a direction loosening a screw upon which the electric screw driver rests.

* * * * *